May 6, 1958  J. F. FROLA ET AL  2,833,381
BRAKE MECHANISM WITH AUTOMATIC SLACK ADJUSTMENT
Filed Sept. 28, 1953  2 Sheets-Sheet 1
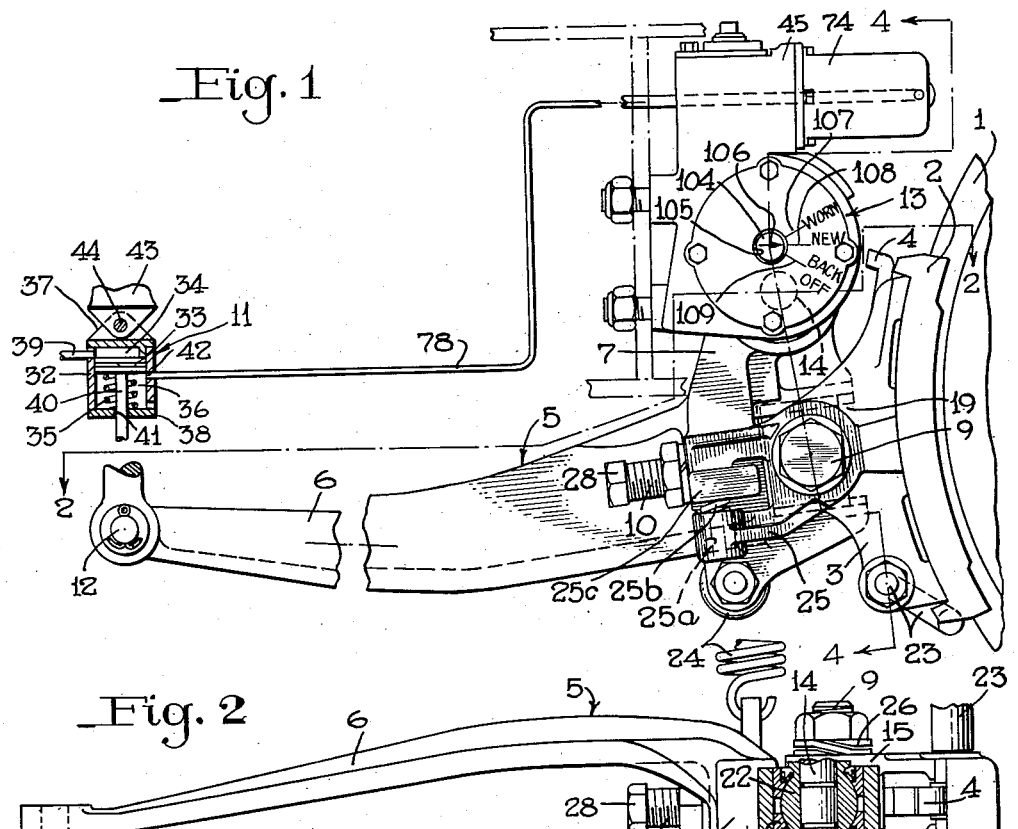
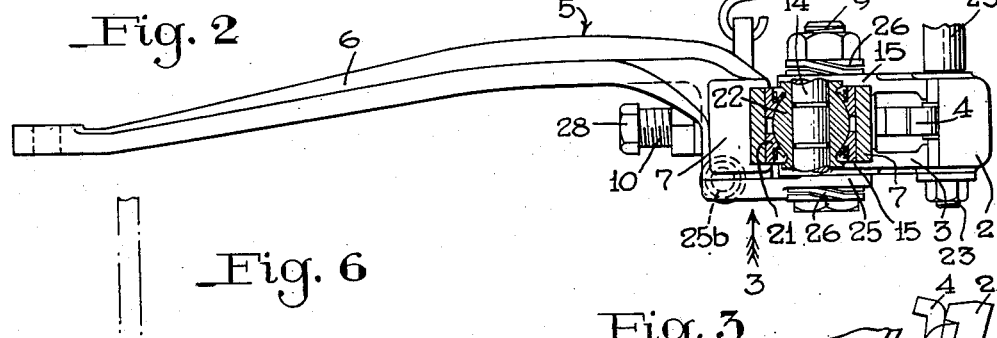
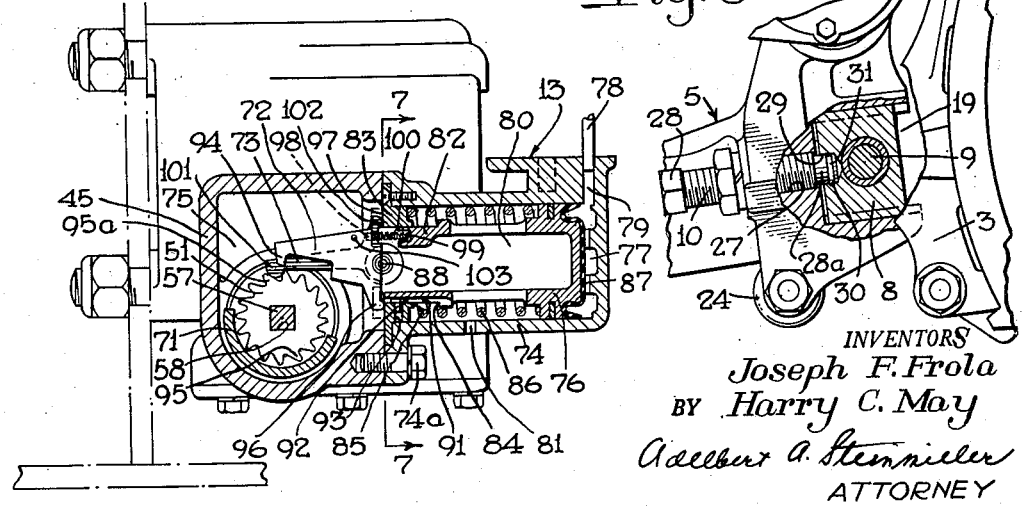
INVENTORS
Joseph F. Frola
Harry C. May
BY Adelbert A. Steinmiller
ATTORNEY

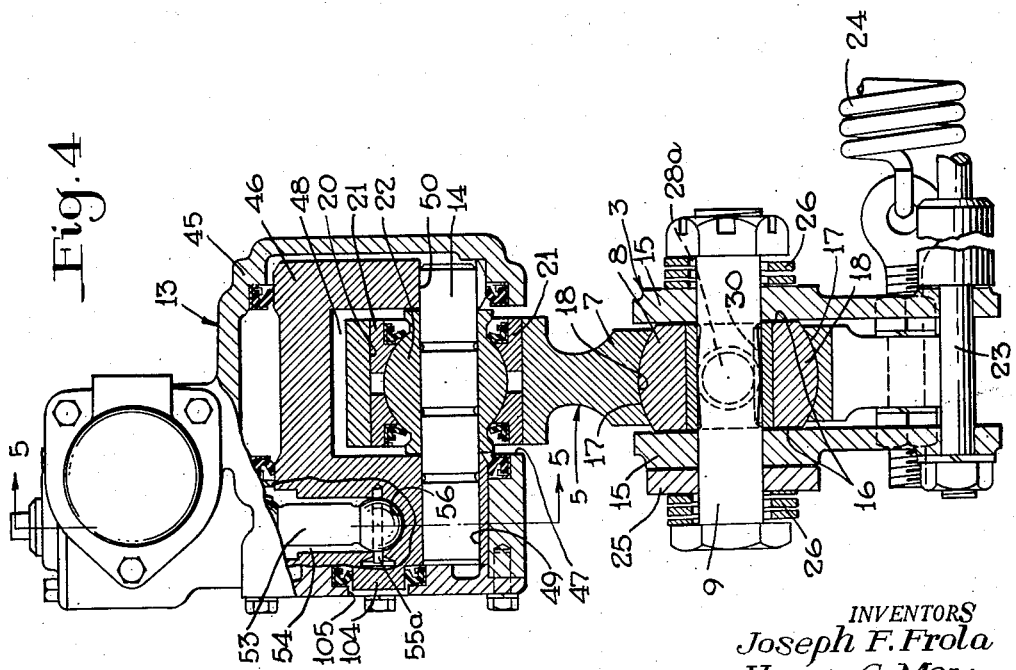

United States Patent Office 2,833,381
Patented May 6, 1958

2,833,381

BRAKE MECHANISM WITH AUTOMATIC SLACK ADJUSTMENT

Joseph F. Frola, Braddock, and Harry C. May, East McKeesport, Pa., assignors to Westinghouse Air Brake Company, Wilmerding, Pa., a corporation of Pennsylvania Application September 28, 1953, Serial No. 382,574

13 Claims. (Cl. 188—198)

This invention relates to fluid pressure operated brake mechanisms and more particularly to such mechanisms which embody slack adjusting means automatically operable to compensate for wear of the braking element and of the rotatable member to be braked.

An object of the invention is to provide an improved brake mechanism of the above type, which is relatively compact and eliminates the need for the relatively intricate actuating linkage employed in brake mechanisms in current use.

Another object of the invention is to provide a brake mechanism in which the automatic slack adjusting means is also manually operable to facilitate replacement of worn brake shoes or worn wheels.

A further object of the invention is to provide an automatic slack adjusting device having indicator means always exposed to view to show the degree of brake shoe wear.

Other objects and advantages will become apparent from the following more detailed description of the invention.

In the accompanying drawings: Fig. 1 is an elevational view, partly in section and partly in outline, of a fluid pressure brake mechanism embodying the invention; Fig. 2 is a plan view taken generally along the line 2—2 of Fig. 1; Fig. 3 is a partial cut-away view, taken in the direction of arrow 3 in Fig. 2, of a portion of the brake mechanism; Fig. 4 is an enlarged sectional view taken along the line 4—4 of Fig. 1; Fig. 5 is a sectional view taken along the line 5—5 of Fig. 4; Fig. 6 is a sectional view taken along the line 6—6 of Fig. 5; and Fig. 7 is a sectional view taken along the line 7—7 of Fig. 6.

DESCRIPTION

Referring to Fig. 1 of the drawings, the improved brake mechanism is shown associated with a member to be brake which, for sake of illustration, may be the usual flanged wheel 1 of a railway car.

Referring to Figs. 1, 2 and 3 of the drawings, the brake mechanism comprises a brake shoe 2 which may be of the usual unflanged type adapted for frictional braking engagement with the tread of the wheel 1 although, if prefererd, a so-called flanged brake shoe may be used which is adapted to accommodate the projecting flange of said wheel; a brake head 3 operatively connected in conventional manner to the brake shoe 2 through the medium of a key 4 for carrying said shoe into and out of engagement with the wheel 1; a substantially L-shaped brake lever 5 having two offset arms 6 and 7 extending from its knee and adapted to actuate the brake head 3 through the medium of an adjusting block 8 adjustably accommodated within a recessed portion of said brake lever near its knee, said block being operatively connected to the brake head 3 through the medium of a pin 9; an adjusting screw 10 for manually varying the position of the block 8; a brake cylinder device 11 operatively connected to the end of brake lever arm 6 through the medium of a pin 12; and an automatic slack adjusting device 13 which carries the brake lever 5 through the medium of a fulcrum pin 14, Fig. 1, about which the end of brake lever arm 7 is fulcrumed, said device 13 being adapted to automatically carry said pin 14 in an arcuate path toward the wheel 1 to maintain desired clearance between the brake shoe 2 and wheel 1 as will be described subsequently in greater detail.

Referring to Figs. 3 and 4 of the drawing, the brake head 3 has two laterally spaced-apart flanges 15, 15 between the adjacent faces of which are accommodated opposite parallel faces 16, 16 of the block 8. The block 8 has convexly curved surfaces 17, 17 which slidably engage complimentary concave surfaces 18, 18 defining a recess 19 formed in the brake lever arm 7 and extending a certain distance inwardly from the end of said arm nearest the wheel 1. The brake lever arm 7 also has a bore 20 near its projecting end, the axis of said bore being parallel to the axis of pin 9. The bore 20 is provided for accommodating disposition therewithin of oppositively arranged, spherically recessed bearings 21, 21 which are mounted about a ball 22 carried by the pin 14, so as to form a ball-in-socket connection therebetween for permitting the lever 5 to rock about said ball when the brake head 3, acting through the block 8, carries the knee portion of said lever laterally in response to lateral movement of the usual tie rod 23, which is operatively connected at its one end to said brake head; such lateral movement may occur, for example, as a result of lateral movement of the car relative to the truck. The tie rod 23 is connected at its opposite end, in the usual manner, to a brake head (not shown) at the opposite side of the car.

In accordance wtih the usual practice, the tie rod 23, with the cooperation of the aforementioned brake heads, is adapted to permit self-aligning movement of the brake shoes upon their engagement with their respective wheels, while a stabilizing anti-rattler spring 24 hooked to the side frame (not shown) and suitably secured to the brake head 3, in cooperation with a similar arrangement at the opposite brake head (not shown) connected to the opposite end of said tie rod, normally maintains said tie rod in a neutral position in which the plane of symmetry of the lever arm 7 is at right angles to the axis of said tie rod and in which the various components are in the positions in which they are shown in Fig. 4 of the drawings. As shown in Figs. 1, 2 and 4 of the drawings, a friction arm 25 mounted at its one end about the pin 9 has a cup-shaped recess 25a at its opposite end for accommodating disposition therewithin of a spring 25b which abuts a lug 25c on lever arm 7. The friction arm 25 exerts side friction on the brake head 3 under action of springs 26, 26 accommodated, respectively, between a headed end of the pin 9 and a nut disposed in threaded engagement with the opposite end of said pin; this side friction maintains the brake shoe 2 in a nominally concentric position relative to the wheel 1, when said shoe is withdrawn from engagement with said wheel.

As shown in Fig. 3 of the drawings, the adjusting screw 10 is threadably accommodated intermediate its ends within a threaded opening 27 in the brake lever arm 7 which opening is coaxially aligned with the axis of symmetry of the recess 19 in said arm. The screw 10 comprises an integrally formed wrench-accommodating head 28 at its exterior end and adjacent its interior end an unthreaded shank portion 28a of reduced diameter accommodated within a coaxially aligned recess 29 in the block 8. The screw 10 is secured to the block 8 through the medium of a pin 30 accommodated in a suitable bore extending transversely through said block with its axis parallel to that of the pin 9, said pin 30 being also partly accommodated within an annular groove 31 formed about the outer periphery of the unthreaded shank portion 28a of said screw; this permits said screw to be rotated relative to the stationary pin 30 and move said block toward or away from the wheel 1, thereby correspondingly moving the pin 9 and brake head 3 and consequently enabling manual adjustment of the clearance between the brake shoe 2 and said wheel.

It will be noted that the block 8 and the pins 9 and 30 constitute, in effect, a universal joint connection between the brake lever 5 and the brake head 3, thereby permitting said lever and brake head to be advanced toward the wheel 1 by manual adjustment of the screw 10 and also permitting rocking of said lever relative to ball 22 without cocking of said brake head when the block 8 is carried laterally by operation of the tie rod 23, as previously explained.

As shown in Fig. 1 of the drawings, the brake cylinder device 11 may, for sake of illustration, comprise a hollow cylindrical casing 32 within which is slidably mounted a piston 33 subject opposingly to pressure of fluid in a pressure chamber 34 and to action of a spring 35 suitably arranged in a non-pressure chamber 36 which is open to atmosphere; said chambers 34 and 36 being defined by the adjacent sides of said piston and by a pressure head 37 and a non-pressure head 38, respectively, suitably secured to the respective ends of said casing. The pressure chamber 34 is chargeable with fluid under pressure from a source thereof (not shown) and ventable to atmosphere by way of a pipe 39. A piston rod 40, centrally disposed partly in non-pressure chamber 36 and extending exteriorly thereof with substantial clearance through an opening 41 in the non-pressure head 38, is operably attached at its one end to the piston 33, while its opposite end is pivotally connected to the end of brake lever arm 6 through the medium of the transverse pin 12. A port 42 is provided through the wall of the cylindrical casing 32 in the path of travel of piston 33, said port being so located as to be open to non-pressure chamber 36 when said piston is in its "release" position in which it is shown in the drawing and to be open to chamber 34 when said piston moves a certain distance in the direction of chamber 36, significant of excessive clearance between the brake shoe 2 and tread of wheel 1, as will be brought out in subsequent description of operation. The pressure head 37 is pivotally connected to a fixed member, such as a member 43 of the car frame, through the medium of a pin 44 for permitting pivotal movement of the brake cylinder device 11 to compensate for changes in the longitudinal position of the lever 5, for reasons which will become apparent from subsequent description.

Referring to Figs. 1, 4 and 5 of the drawings, the automatic slack adjusting device 13 comprises a body 45 within which is rotatably accommodated a cylinder 46, the axis of which is parallel to the axes of the pins 9, 12 and 14, for reasons which will become apparent from subsequent description.

As viewed in Fig. 4 of the drawings, the body 45 intermediate its ends has an opening 47 in its lower side which is aligned with an upwardly extending recess 48 formed in the cylinder 46 for accommodating within said recess and opening the upper projecting portion of brake lever arm 7 including the ball 22 by which said arm is pivoted on the fulcrum pin 14. The pin 14 is, in turn, eccentrically carried by the cylinder 46, being supported within coaxially aligned bores 49, 50 provided in said cylinder at opposite sides of the recess 48 at a uniform radial distance from the axis of said cylinder. The cylinder 46, upon its rotation in the manner to be described subsequently, is adapted to carry the fulcrum pin 14 in an arcuate path, in opposite directions out of a "New" datum position in which it is shown in Fig. 5 of the drawings, to a "Worn" limit position or a "Back Off" limit position (denoted by suitable legends and to be subsequently defined), thereby carrying the brake lever arm 7 in a direction toward or away from the wheel 1, respectively, and correspondingly decreasing or increasing the clearance between the brake shoe 2 and the tread of said wheel, as will be described subsequently.

Referring now to Figs. 4, 5 and 6 of the drawings, the rotative position of cylinder 46 is adapted to be controlled by a ratchet wheel 51 which actuates a slack take-up screw 52 which, in turn, is operatively connected to said cylinder through the medium of a connecting rod 53, the structure and cooperative relationship of which will now be described in detail. The connecting rod 53 is in the form of a cylinder having balls of enlarged diameter integrally formed at its respective ends. As viewed in Figs. 4 and 5 of the drawings, the rod 53 is substantially vertically disposed partly within a suitable recess 54 formed in the cylinder 46 and extending downwardly from the outer peripheral surface of said cylinder. A flat stop face 55, forming one wall of the recess 54, extends angularly in a direction parallel to the axis of the cylinder 46, such that upon rotation of said cylinder in a counterclockwise direction, as viewed in Fig. 5 of the drawings, said face will move in an arcuate path into abutting engagement with the cylindrical portion of the rod 53 for thereby defining the previously mentioned "Worn" limit position of the pin 14, in which further rotation of said cylinder is prevented, because in such instance the brake shoe 2 and, occasionally, the wheel 1 have become worn to such an extent that either or both should be replaced. The rod 53 is pivotally connected to the cylinder 46 through the medium of a pin 55a which extends centrally through the lower ball portion of said rod such that the axes of the pins 55a and 14 are parallel and are also disposed at substantially equal radial distances from the axis of said cylinder.

The slack take-up screw 52 has at its lower end, as viewed in Fig. 5 of the drawings, a socket-like recess 56 for accommodating therewithin the upper ball portion of the rod 53, the lowermost ends of said screw adjacent said reecess being peened about the said ball portion to form a ball-in-socket connection therebetween for operably securing said rod to said screw. The screw 52 has at its upper end an integrally formed, upwardly extending, centrally disposed shank 57 of square cross-section which is accommodated within, and extends upwardly of, a square opening 58 extending vertically in coaxial alignment through the ratchet wheel 51 for providing a sliding operative connection between said wheel and said screw. The screw 52 has adjustable screw-threaded engagement within a threaded bushing 59, which in turn is disposed in screw-threaded engagement within a vertically disposed threaded opening 60 in the body 45. The bushing 59 has at its upper end an integrally formed, outwardly directed annular flange 61, the lower radial face of which seats against an annular seating shoulder 62 formed on the body 45, while integrally formed with the upper radial face of said flange is an inwardly directed annular flange 63. Radial wrench accommodating openings 64 are provided in the flange 61 to permit the bushing 59 to be tightened into seating engagement with shoulder 62. The upper transverse end of the screw 52 is adapted for abutting engagement with the lower radial face of the flange 63 for thereby defining by such engagement the aforementioned "Back Off" position of pin 14, in which maximum clearance between the shoe 2 and wheel 1 is obtained for facilitating replacement of said shoe and/or wheel; while the upper radial face of said flange supports the ratchet wheel 51, by abutting engagement with an annular boss 65 formed integrally with the lower face of said wheel about the opening 58.

The ratchet wheel 51 has an integrally formed annular sleeve 66 which extends centrally upward from a boss 67 provided at the upper face of said wheel. A wrench-accommodating element 68 is partially accommodated within, and suitably secured to, the upper part of sleeve 66 by a pin 69 extending diametrically through said sleeve and said element. The sleeve 66 is rotatable within an opening 70 extending vertically through a bearing element 71 suitably secured to the upper part of the body 45, the lower end of said element engaging the upper end of the bushing 59 to prevent loosening of said bushing due to vibration. The ratchet wheel 51 is not only automatically rotatable, in the manner to be presently described, but is also manually rotatable through application of a turning force to the wrench-accommodating element 68, for thereby actuating the cylinder 46 through the medium of the take-up screw 52 and the rod 53, for facilitating renewal of the brake shoe 2, as will be described subsequently.

As shown in Fig. 6 of the drawings, the ratchet wheel 51 is rotatable by a slack take-up pawl 72 which acts cooperatively with a detent 73 to effect automatic take-up of slack whenever the piston 33 of the brake cylinder device 11 travels a sufficient distance during a brake application to expose the port 42 to pressure of fluid in the pressure chamber 34, as will now be described in detail. A hollow casing 74, completely closed except at its one end, is suitably secured, as by screws or bolts 74a to the body 45 such that the open end of said casing is in alignment with one end of a chamber 75 provided in said body and in which chamber the ratchet wheel 51 is disposed.

A piston 76 is slidably mounted within the casing 74, defining between it and the closed end of said casing a pressure chamber 77 which is in constant fluid pressure communication with the port 42 of the brake cylinder device 11 by way of a pipe 78 and a port 79 formed in said casing. At the side of piston 76 opposite the pressure chamber 77 is a non-pressure chamber 80 open to atmosphere by way of a port 81 in the wall of casing 74. The piston 76 has an integrally formed, coaxially aligned, hollow piston rod 82 which is disposed in the non-pressure chamber 80 and slidably guided adjacent its unattached end within an annular stop element 83 suitably secured within the open end of casing 74. The piston rod 82 intermediate its end is provided with a radial shoulder 84 adapted for abutting engagement with a stop shoulder 85 formed by the transverse face of the element 83 nearest chamber 77 for thereby defining by such engagement an "applied" position of said piston in which further movement of said piston toward the ratchet wheel 51 is prevented. A helical spring 86 surrounds the piston rod 82 between the piston 76 and annular element 83 for urging said piston toward a "release" position, defined by abutting engagement of said piston with a transverse stop boss 87 formed integrally with casing 74 at the end of the pressure chamber 77.

As shown in Figs. 6 and 7 of the drawings, the take-up pawl 72 and the detent 73 are pivotally connected to the hollow piston rod 82 for carriage thereby through the medium of a pin 88. The pin 88 is secured at its ends within aligned bores 89, 89 of a yoke 90 formed integrally with the end of the piston rod 82 nearest the ratchet wheel 51. As shown in Fig. 6 of the drawings, a longitudinal groove 91 is formed in the outer periphery of the piston rod 82 for accommodating the head of a guide pin 92 disposed in a radial bore 93 in the element 83 for maintaining proper alignment of said rod for cooperation of pawl 72 and detent 73 with the ratchet wheel 51.

As viewed in Fig. 6 of the drawings, the pawl 72 has a longitudinally extending arm having, at its end farthest from the pin 88, an integrally formed, downwardly extending finger 94 adapted for engagement with teeth 95 formed about the outer periphery of the ratchet wheel 51 for effecting clockwise rotation of said wheel for automatically taking up slack, under certain conditions, during a brake release. The pawl 72 also has a disengaging lug 96 which extends downwardly below the pin 88 and is adapted for abutting engagement with the outer transverse face 97 of the annular stop element 83 to thereby exert a clockwise moment on said pawl about said pin to maintain the finger 94 disengaged from the ratchet teeth 95 when piston 76 is in its "release" position; said pawl being further provided, above and in proximity of the pin 88, with a horizontaly disposed recess 98 coaxially aligned with a recess 99 formed in the adjacent end of said piston rod. A relatively light spring 100 is arranged within the recesses 98 and 99 to urge said pawl in a counterclockwise direction about the pin 88 in favor of engagement of the finger 94 with the teeth 95 of the ratchet wheel 51.

As viewed in Fig. 6 of the drawings, the detent 73 has a longitudinally extending arm having, at its end farthest from the pin 88, an integrally formed, downwardly extending finger 101 adapted to be accommodated within the notches between the teeth 95 of the ratchet wheel 51. The detent 73 also has an operating lug 102 which extends upwardly above the pin 88 and is adapted for abutting engagement with the outer transverse face 97 of the annular element 83 for thereby exerting a counterclockwise moment on said detent about said pin for holding the finger 101 against the ratchet wheel 51 to secure said wheel against undesired rotation.

As shown in Fig. 6 of the drawings, a transverse stop pin 103 suitably secured to the pawl 72 extends exteriorly of the side of said pawl adjacent the detent 73 for preventing, through contact of said detent therewith, excessive upward movement of said detent as it is carried by the pin 88 during movement of the piston 76 into its previously defined "applied" position.

As shown in Figs. 1 and 4 of the drawings, the cylinder 46 has a coaxial reduced diameter portion 104 at its one axial end which is rotatable in sealing engagement with the wall of an aligned opening 105 extending through the end wall of the body 45 so as to expose to view an indicating arrow 106 inscribed in the end face of said portion. Three lines 107, 108, 109 bearing legends "Worn," "New" and "Back Off," respectively, are inscribed in the body 45 adjacent the opening 105 and so disposed that they will denote, when the arrow 106 is selectively in registry therewith, that the fulcrum pin 14 is correspondingly in one of its previously defined, similarly designated positions, for reasons to be brought out in subsequent description of operation.

*Operation*

In operation, let it be assumed that the pressure chamber 34 of the brake cylinder device 11 and the pressure chamber 77 of the automatic slack adjusting device 13 are at atmospheric pressure; that following the installation of a new brake shoe 2, the fulcrum pin 14 is so disposed that the indicating arrow 106 is in registry with the line 108 inscribed on body 45 and bearing the legend "New"; and that there is proper nominal operating clearance between the brake shoe 2 and the wheel 1.

Under these assumed conditions, the various components of the improved brake mechanism will be in the positions in which they are shown in the respective figures of the drawing.

Assume now that it is desired to effect a brake application. The pressure chamber 34 of the brake cylinder device 11 is charged with fluid under pressure by actuating suitable valve means (not shown) to cause the piston 33, through the medium of the piston rod 40 and pin 12, to pivot the brake lever 5 in a counterclockwise direction, as viewed in Fig. 1 of the drawings, about the fulcrum pin 14.

During this pivotal movement of the lever 5, the block 8 and hence the pin 9 and brake head 3 are carried in an arcuate path toward the wheel 1, thereby carrying the new brake shoe 2 into frictional braking engagement with said wheel.

During successive brake applications, the clearance between the brake shoe 2 and wheel 1 will increase due to wear, requiring the piston 33 to travel increasingly further in the direction of chamber 36 to effect a brake application. When this clearance exceeds an amount predetermined according to design, the piston 33 will, during a brake application, travel sufficiently far to expose the port 42 to pressure of fluid in the pressure chamber 34, and as a result of such exposure fluid under pressure will be admitted to the pressure chamber 77 of the automatic slack adjusting device 13 by way of the pipe 78 and port 79. Pressure of fluid thus supplied to chamber 77 will cause the piston 76 to advance the piston rod 82 against resistance of spring 86, causing said rod, in turn, to initially carry the take-up pawl 72 and detent 73, through the medium of pin 88, out of abutting engagement with the stop face 97 of the stop element 83, and thereafter longitudinally advance said pawl and detent until movement of said rod is terminated upon said piston attaining its previously defined "applied" position.

During this movement of the piston rod 82, the pawl 72 will pivot in a counterclockwise direction about the pin 88 under action of the spring 100 such that the finger 94 of said pawl will drop into the notch formed immediately to the left of a tooth 95a of teeth 95 on ratchet wheel 51, as viewed in Fig. 6 of the drawing; and simultaneously said detent will be carried in a generally longitudinal direction out of engagement with said tooth, excessive movement of said detent about pin 88 being prevented by contact thereof with the stop pin 103. The pawl 72 and detent 73 will remain in their above-described positions until the brakes are released.

Assuming now that it is desired to release the brakes, fluid under pressure is vented from the pressure chamber 34 of the brake cylinder device 11, causing the piston 33 to return, under action of spring 35, to a "release" position defined by abutting engagement of said piston with a stop formed integrally with the end of the pressure head 37. During this movement of the piston 33, the piston rod 40, acting through the pin 12 causes the brake lever 5 to pivot in a clockwise direction about the fulcrum pin 14, causing said lever, in turn, to effect disengagement of the shoe 2 from the wheel 1.

During the aforementioned venting of brake cylinder chamber 34, the pipe 78 and pressure chamber 77 of the automatic device 13 are completely vented to atmosphere by way of the port 42 and non-pressure chamber 36 in said brake cylinder device. As fluid under pressure is thus vented from chamber 77, the piston 76 will be caused to move to its previously defined "release" position under action of spring 86, carrying with it the pawl 72 and detent 73 through the medium of the piston rod 82. As the pawl 72 is thus carried, its finger 94 operatively engages the left hand face of tooth 95a as viewed in Fig. 6 of the drawings, and effects rotation of the ratchet wheel 51 in a clockwise direction through an arc subtended by approximately the width of one full tooth 95, by which time the lug 96 of said pawl has been carried by the piston rod 82 substantially into abutting engagement with the stop face 97 of element 83; with said lug so engaged, continued movement of said piston rod causes said pawl, against resistance of the relatively light spring 100, to fulcrum in a clockwise direction about its now stationary lug 96, thereby disengaging said finger from the tooth 95a.

During this previously described movement of the piston 76 into its "release" position, the detent 73 is carried in substantially a straight line by the pin 88, until the operating lug 102 abuts the stop face 97 of element 83; whereupon continued movement of said piston rod causes said stop face, by way of the now stationary lug, to exert a counterclockwise moment on said detent about said pin 88 successively carrying and then firmly holding the detent finger 101 against the tooth to the left of tooth 95a, which will now be in the position in which the tooth 95a is shown in Fig. 6 of the drawing, and thereby securing the ratchet wheel 51 against undesired rotation in a counterclockwise direction.

It will thus be seen that if and when the slack is excessive, the pressure chamber 77 of the automatic device 13 will be pressurized during a brake application, causing the pawl 72 to be carried into a notch immediately to the left of that in which the detent 73 has been disposed; and that upon subsequent depressurization of said chamber, said pawl will be carried toward said chamber to effect clockwise rotation of the ratchet wheel 51 and thereafter be carried out of engagement with said ratchet wheel while the detent 73 is carried into engagement with said ratchet wheel to secure same against undesired rotation.

During previously described clockwise rotation of the ratchet wheel 51, said wheel, through the medium of the shank 57, advances the take-up screw 52 a short distance toward the pin 55a, thereby causing the connecting rod 53 operably connected to said screw to effect rotation of the cylinder 46 through a small angle in a counterclockwise direction, as viewed in Fig. 5 of the drawings. During such rotation, the cylinder 46 carries the brake lever fulcrum pin 14 a slight arcuate distance toward its previously defined and suitably designated "Worn" position and, at the same time, the indicating arrow 106 is carried by said eccentric through the aforementioned small angle toward registry with the line 107 bearing the legend "Worn." As the fulcrum pin 14 is thus carried toward its "Worn" position, the brake lever arm 7 is advanced toward the wheel 1, thereby reducing the clearance between the shoe 2 and the tread of said wheel, through the medium of the block 8, pin 9 and brake head 3.

During successive brake applications, the slack adjusting device 13 will operate automatically, as and when required, to maintain desired clearance between the shoe 2 and the tread of wheel 1, by progressively advancing the brake lever fulcrum pin 14 toward its previously described "Worn" position, in the manner previously described in detail; and the degree of wear of said shoe will be known at all times by observing the position of the indicating arrow 106 relative to the groove 107 bearing the legend "Worn."

Assume now that an inspection of the indicating arrow 106 shows that the fulcrum pin 14 has substantially attained its previously defined "Worn" position and that the worn brake shoe 2 should consequently be replaced. At such time the various components of the device 13 will be in the positions in which they are shown in Fig. 6 of the drawing; that is, the pawl finger 94 will be disengaged from the teeth 95 with the piston 76 in its "release" position, while the detent finger 101 will be in engagement with the ratchet wheel 51.

To replace the brake shoe 2, the repairman fits a wrench about the element 68 and turns said wrench to cause the ratchet wheel 51 and its sleeve 66 to turn in a counterclockwise direction as viewed in Fig. 6 of the drawings. As the ratchet wheel 51 is turned, the teeth 95 ratchet past the finger 101 of the detent 73, causing said detent to rock alternately, clockwise and counterclockwise, about its lug 102 (which remains engaged with the stop face 97) and correspondingly carry the pin 88 alternately toward said ratchet wheel against compression of the spring 86 acting on piston 76 and then back to a normal position in which it is shown in the drawing. The ratchet wheel 51 is manually rotated in the above manner until the indicating arrow 106, by registry with the groove 109, shows that the fulcrum pin 14 is in its previously defined "Back Off" position, in which there is sufficient clearance to facilitate replacement of the brake shoe 2 in the manner well known in the railway brake art. To provide additional clearance, if desired, the manual adjusting screw 10 may be loosened by turning its head 28 so as to draw the block 8 (through the medium of the pin 30) and hence the pin 9 toward the pin 12 and thus carry the brake head 3 and shoe 2 further away from the wheel 1.

Assuming now that the brake shoe 2 has been replaced, the repairman now wrench turns the element 68 in the opposite direction to effect clockwise rotation of the ratchet wheel 51, during which the teeth 95 ratchet in the reverse direction past the detent finger 101. The element 68 is turned until the indicating arrow 106, by registry with the groove 108, shows that the fulcrum pin 14 is in its "New" position, in which it is shown in Fig. 5 of the drawing; whereupon the repairman manually adjusts the position of the brake head 3 by applying a wrench to the head 28 of screw 10 and rotating said screw to obtain proper nominal operating clearance between the brake shoe 2 and wheel 1.

Let it now be assumed that, as a result of inadvertence or the lack of time or facilities, the brake shoe 2 is not replaced at or prior to the time the pin 14 attains its previously defined "Worn" position, in which further automatic rotation toward the wheel is prevented through engagement of the stop face 55 with the connecting rod 53. The brake lever 5 will nevertheless be operative to fulcrum about pin 14 to carry the shoe 2 into engagement with the wheel 1, although the piston 33 of brake cylinder device 11 will, of course, have to travel an increasing distance toward the pin 12 during subsequent brake applications. Meanwhile, since the ratchet wheel 51 is not free to rotate, the finger 94 of the pawl 72 will remain engaged with one of the teeth 95 by pulling action of the piston return spring 86 which is unable to cause rotation of said ratchet wheel and return the piston 76 to its previously defined "release" position. Under such conditions, the repairman initially exerts a force through the medium of a wrench on the element 68 so as to move the ratchet wheel 51 very slightly in a counterclockwise direction, as viewed in Fig. 6 of the drawings, against resistance of the spring 86, so that the finger 94 of the pawl 72 will be lifted by the cam-like arcuate movement of the adjacent tooth engaged therewith, until said finger is free of said adjacent tooth; whereupon, under action of the spring 86 on the piston 76 and the action of spring 100, said pawl will drop into the notch to the right, as viewed in Fig. 6 of the drawing, of the notch in which it was formerly disposed. The repairman then relaxes his force on the wrench to permit the spring 86 to carry the piston 76 to its "release" position, during which the ratchet wheel 51 will be rotated slightly in a clockwise direction, as during previously described automatic slack take-up, permitting the pawl lug 96 to fulcrum the pawl finger 94 out of engagement with the ratchet teeth 95 and causing the detent finger 101 to engage the ratchet wheel in the manner previously described. The respective components of the automatic device 13 will now be in the positions in which they are shown in Fig. 6 of the drawing, and the repairman proceeds, in the manner previously described, to effect replacement of the brake shoe 2.

SUMMARY

It will now be seen that the improved fluid pressure brake mechanism is relatively compact and is operable automatically, as and when required, to maintain desired clearance between the brake shoe and wheel by automatically advancing the brake lever fulcrum pin 14 toward said wheel to compensate for wear of the brake shoe and said wheel.

It will also be seen that the automatic slack adjusting means embodied in the improved brake mechanism is manually operable to carry the fulcrum pin 14 to a "Back Off" position to provide added clearance between the shoe and wheel to facilitate brake shoe replacement.

The improved brake mechanism also embodies readily visible indicating means which shows at all times the degree of brake shoe wear, thereby facilitating timely replacement of worn shoes, and also indicates position of the fulcrum pin 14 as in or between its previously described "Back Off" limit position and its "New" datum position.

Having now described our invention, what we claim as new and desire to secure by Letters Patent, is:

1. In a fluid pressure brake mechanism of the type comprising a braking element for frictional braking engagement with a rotatable member to be braked, the combination of a lever comprising two rigidly connected arms projecting in different directions from a common junction portion, said lever being operatively connected in proximity of said junction portion to said braking element, support means carrying one arm of said lever for permitting pivotal movement of said lever relative thereto, a brake cylinder device pivotally connected to the other arm of said lever for controlling such pivotal movement, power means for shifting position of said support means to thereby reduce the amount of arcuate travel of said lever in effecting such engagement to compensate for wear of the braking element and the member to be braked, and means effective in response to arcuate travel of said lever exceeding a certain amount in effecting braking engagement of the braking element with the member to be braked for initiating operation of said power means.

2. In a fluid pressure brake mechanism of the type comprising a braking element for frictional braking engagement with a rotatable member to be braked, the combination of a lever comprising a live arm rigidly connected to and projecting in angular relationship to another arm and rockably carrying said braking element in proximity of the junction of said arms, a fulcrum element having hinged connection with said other arm of said lever, a rotatable element carrying said fulcrum element at a fixed radial distance from the axis of rotation thereof, power means operative to effect rotation of said rotatable element to thereby shift the position of said fulcrum element so as to reduce the amount of arcuate travel of said lever required to effect such engagement in order to compensate for wear of the braking element and the member to be braked, and means automatically operative whenever arcuate travel of said lever exceeds a certain amount in effecting braking engagement of the braking element with the member to be braked to cause operation of said power means.

3. The combination according to claim 2, including manually operable means for at any time effecting rotation of said rotatable element in one direction or an opposite direction.

4. In a fluid pressure brake mechanism of the type comprising a brake head for carrying a brake shoe into and out of frictional braking engagement with a rotatable member to be braked, the combination of a brake lever for actuating said brake head, said brake lever having one transverse side nearest said rotatable member and also having a recess defined by concave surfaces extending inward from said one side, an element disposed in said recess and having convex surfaces for slidably engaging said concave surfaces, hinge means providing a hinged connection between said element and brake head, means carried by said brake lever and manually adjustable for moving said element and hinge means longitudinally toward and away from said rotatable member for thereby shifting the position of said brake head relative to said brake lever, a fulcrum pin for supporting said brake lever and permitting generally longitudinal arcuate movement of said brake lever, and means interposed between said fulcrum pin and brake lever for permitting transverse rocking movement of said brake lever responsively to transverse straight-line movement of said brake head.

5. In a fluid pressure brake mechanism of the type comprising a brake head for carrying a brake shoe into and out of frictional braking engagement with a rotatable member to be braked, the combination of a transverse fulcrum pin, a ball rigidly mounted on said fulcrum pin, a brake lever rockably carried by said ball for actuating said brake head, said brake lever having one transverse side adjacent said rotatable member and also having a recess formed by oppositely arranged, transversely curved surfaces extending longitudinally inward from said one side, an element having oppositely arranged, transversely curved surfaces for longitudinal and transverse sliding engagement with the curved surfaces of said recess, a second transverse pin providing a hinged connection between said element and brake head, manually adjustable means for moving said element longitudinally within said recess for thereby shifting the position of said second pin and brake head relative to said brake lever in directions toward and away from said rotatable member, said brake lever being rockable about said ball by movement of said element in response to transverse movement of said brake head.

6. In a fluid pressure brake mechanism of the type comprising a braking element for frictional braking engagement with a rotatable member to be braked, the combination of a brake lever comprising two rigidly connected arms extending in different directions from a common junction portion, said braking element being operably carried by said lever in proximity of said junction portion, a fulcrum pin about which one arm of said lever is pivotable, a fluid pressure operated brake cylinder device pivotally connected to the other arm of said lever for pivoting said lever about said fulcrum pin to effect movement of the braking element into braking engagement with the member to be braked, a rotatable element carrying said fulcrum pin at a fixed radial distance from the axis of rotation thereof, and slack adjusting means operative automatically, whenever the slack clearance between said braking element and said rotatable member exceeds a certain predetermined amount in effecting a brake application, to effect rotation of said rotatable element during the succeeding brake release for so shifting the position of said fulcrum pin as to effect a reduction of said clearance to less than said predetermined amount.

7. In a fluid pressure operated brake mechanism, comprising, in combination with a brake lever fulcrum pin, a rotatable element for carrying said pin in an arcuate path between a "Back Off" limit position and a "Worn" limit position, said rotatable element being provided with a recess, one of the defining walls of which serves as a stop face, connecting rod means disposed partly in said recess and operatively connected at one end to said rotatable element, a slack take-up screw operatively secured to the opposite end of said rod means, and a ratchet wheel operatively connected to said screw and rotatable in one direction for causing said pin to be carried into said "Worn" limit position defined by contact of said stop face with said rod means and rotatable in an opposite direction to cause said pin to be carried into said "Back Off" limit position defined by abutting engagement of said screw with a stop shoulder.

8. The combination according to claim 7, wherein said fulcrum pin also has a "New" datum position intermediate its said limit positions and from which "New" position such fulcrum pin is movable to said "Worn" position in response to automatic, step-by-step rotation of said ratchet wheel, means including power-operated means for effecting such automatic rotation, a brake cylinder for effecting arcuate movement of said brake lever about said fulcrum pin to apply brakes, said brake cylinder comprising a piston separating a pressure chamber from a non-pressure chamber, and fluid pressure conveying means normally exposed to said non-pressure chamber and uncovered by said piston to said pressure chamber only when said piston travels an excessive amount indicative of an excessive slack condition, beyond a normal operating range, for thereby initiating operation of said power-operated means.

9. The combination according to claim 8, including means for effecting manual rotation of said ratchet wheel for at any time enabling said fulcrum pin to be carried into said "Back Off" or "Worn" limit positions or to any desired arcuate position therebetween.

10. In a fluid pressure brake mechanism of the type comprising a brake head for carrying a brake shoe into frictional braking engagement with a rotatable member to be braked, the combination of a substantially L-shaped brake lever having near its knee a recess having oppositely arranged curved surfaces extending longitudinally inward from one side nearest said rotatable member and also having a threaded opening extending longitudinally inward from the opposite side to said recess, a block disposed in said recess and having oppositely arranged, transverse curved surfaces complementary with said curved surfaces of said recess for slidable engagement therewith, said block also having a bore coaxially aligned with and adjacent to said threaded opening, a first connecting pin extending transversely through said brake head and said block, manually operable block adjusting means comprising a screw portion disposed in said threaded opening and an unthreaded shank formed at one end of said screw portion and projecting into said bore, said shank portion having an annular groove in its outer periphery intermediate its ends, and a second connecting pin extending transversely through said block and accommodated partly within said groove, said block, adjusting means and first and second pins thereby constituting an operative connection between said brake lever and said brake head whereby transverse movement of said brake head will cause rocking of said brake lever and whereby rotative movement of said screw in one direction or an opposite direction will cause movement of said brake head longitudinally relative to said lever in a direction toward or away from said rotatable member, respectively.

11. A fluid pressure brake mechanism comprising, in combination, a lever having two rigidly connected arms projecting in different directions from a common junction portion, a transverse fulcrum pin carrying one of said arms for permitting pivotal arcuate movement of said lever relative thereto, fluid pressure operable brake applying means adapted to act on the other arm of said lever for effecting said arcuate movement, a rotatable member carrying said fulcrum pin at a fixed radial distance from the axis of rotation of said rotatable member, another member slidable in a generally longitudinal direction relative to said lever and in proximity of said junction portion, braking means for frictional braking engagement with a member to be braked and having rockable connection with said other member, manually adjustable means carried by said lever and operatively connected to said other member for controlling the longitudinal position of said other member and braking means relative to said lever, conduit means normally vented and charged with fluid under pressure responsively to movement of said brake applying means in excess of a certain amount in effecting a brake application, said amount being significant of excessive clearance between said braking means and member to be braked, and slack adjusting means operable in response to supply of fluid under pressure to and subsequent release of fluid under pressure from said conduit means for successively initiating and then effecting a slack take-up operation whereby said rotatable member is rotated through a small arcuate increment for thereby advancing said fulcrum pin in an arcuate path generally toward the member to be braked so as to reduce such clearance.

12. A fluid pressure brake mechanism comprising a fulcrum pin, a brake lever pivotable about said fulcrum pin for effecting a brake application, a rotatable member carrying said fulcrum pin in eccentric relationship to the axis of said member, rotatable ratchet means, screw means arranged coaxially with said ratchet means and responsive to rotation of the latter to advance axially in straight-line movement toward said rotatable member, means defining a chamber, connecting means providing an operative ball-in-socket-like connection between said screw means and rotatable member, said connecting means being operatively connected to said rotatable member at a point spaced from the axis of the latter, motor means operable by successive supply of fluid under pressure to and subsequent release of fluid under pressure from a chamber to effect a slack take-up operation by effecting limited rotation of said ratchet means during such subsequent release of fluid under pressure for thereby causing movement of said screw means and connecting means to effect a corresponding limited degree of rotation of said rotatable member and thereby correspondingly shift said fulcrum pin a limited arcuate distance toward a member to be braked, and means operative responsively to movement of said brake lever in excess of a predetermined amount during such brake application for supplying fluid under pressure to said chamber and operatively responsively to subsequent release of such brake application to release fluid under pressure from said chamber.

13. In a fluid pressure brake mechanism of the type comprising a member to be braked, the combination of a fulcrum pin, a brake lever pivotable about said fulcrum pin for applying a braking force to the member to be braked, rotatable means for carrying at a certain distance from its axis of rotation said fulcrum pin, a ratchet wheel for effecting rotation of said rotatable means through successive small angular increments for thereby advancing said fulcrum pin step-by-step toward the member to be braked, a pawl member, actuating means operable by fluid under pressure supplied thereto only upon pivotal movement of said brake lever in excess of a chosen degree in applying the braking force to the member to be braked to carry said pawl member into engagement with said ratchet wheel, said actuating means being operative upon venting of such fluid under pressure to cause said pawl member to rotate said ratchet wheel through a small angle and then withdraw from engagement therewith, a detent member carried by said actuating means for engaging said ratchet wheel to secure the same against undesired rotation upon said venting of fluid under pressure from said actuating means.

References Cited in the file of this patent

UNITED STATES PATENTS

| | | |
|---|---|---|
| 1,144,866 | Rose | June 29, 1915 |
| 1,559,503 | Clegg | Oct. 27, 1925 |
| 1,907,175 | Browall | May 2, 1933 |
| 2,118,236 | Schwentler | May 24, 1938 |
| 2,128,037 | Cameron | Aug. 23, 1938 |
| 2,236,259 | Cameron | Mar. 25, 1941 |
| 2,550,731 | Tack | May 1, 1951 |
| 2,550,732 | Tack et al. | May 1, 1951 |
| 2,724,464 | Sale | Nov. 22, 1955 |